(12) United States Patent
Cummins et al.

(10) Patent No.: US 8,296,482 B2
(45) Date of Patent: Oct. 23, 2012

(54) TRANSLATING REQUESTS BETWEEN FULL SPEED BUS AND SLOWER SPEED DEVICE WHEREIN THE TRANSLATION LOGIC IS BASED ON SNOOP RESULT AND MODIFIED CACHE STATE

(75) Inventors: Thomas S. Cummins, Chandler, AZ (US); Kris W. Utermark, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 12/824,188

(22) Filed: Jun. 27, 2010

(65) Prior Publication Data

US 2011/0320760 A1      Dec. 29, 2011

(51) Int. Cl.
*G06F 12/10* (2006.01)
*G06F 13/00* (2006.01)

(52) U.S. Cl. .............. 710/60; 710/29; 710/58; 710/112; 710/117; 710/310; 711/206; 711/E12.061

(58) Field of Classification Search .................... 710/60, 710/29, 58, 112, 117, 310
See application file for complete search history.

(56) References Cited

U.S. PATENT DOCUMENTS

| | | | | |
|---|---|---|---|---|
| 5,440,707 A | * | 8/1995 | Hayes et al. | 711/3 |
| 6,356,972 B1 | * | 3/2002 | Chin et al. | 710/310 |
| 6,732,208 B1 | * | 5/2004 | Alsaadi et al. | 710/112 |
| 7,047,336 B2 | | 5/2006 | Lin et al. | |
| 7,689,849 B2 | * | 3/2010 | Sokorac | 713/323 |

* cited by examiner

*Primary Examiner* — Tammara Peyton
(74) *Attorney, Agent, or Firm* — Caven & Aghevli LLC

(57) ABSTRACT

Methods and apparatus related to techniques for translating requests between a full speed bus and a slower speed device are described. In one embodiment, a translation logic translates requests between a full speed bus (such as a front side bus, e.g., running relatively higher frequencies, for example at MHz levels) and a much slower speed device (such as a System On Chip (SOC) device (or SOC Device Under Test (DUT)), e.g., logic provided through emulation, which may be running at much lower frequency, for example kHz levels). Other embodiments are also disclosed.

18 Claims, 5 Drawing Sheets

TRANSLATING REQUESTS BETWEEN FULL SPEED BUS AND SLOWER SPEED DEVICE WHEREIN THE TRANSLATION LOGIC IS BASED ON SNOOP RESULT AND MODIFIED CACHE STATE

FIELD

The present disclosure generally relates to the field of electronics. More particularly, an embodiment of the invention relates to techniques for translating requests between a full speed bus and a slower speed device.

BACKGROUND

Input/output (IO) transactions are one of the major bottlenecks for computing devices, for example, when transactions are transmitted between a high speed processor (or a high speed bus attached to a processor) and slower devices. In some implementations, to ensure data correctness, the processor may need to be placed in a lower speed state to run at the frequency of the slower attached device. This in turn increases latency and reduces efficiency in computing devices.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may allow translating requests between a full speed bus (such as a front side bus, e.g., running relatively higher frequencies, for example at MHz levels) and a much slower speed device (such as a System On Chip (SOC) device (or SOC Device Under Test (DUT)), e.g., logic provided through emulation, which may be running at much lower frequency, for example kHz levels). Generally, a processor may be connected to a chipset directly. Both devices are capable of initiating transactions, both devices can drive snoop results, both devices can drive data on the data bus; however, the chipset is responsible for saying that it's ready to receive data as well as driving the response. By contrast, an embodiment of translation logic may couple a processor and a chipset, i.e., appear as the chipset to the processor and appear as the processor to the chipset. This in turn allows for queuing requests at one clock frequency and de-queued at another frequency. In various embodiments, the translation logic may utilize one or more of: snoop stalling, arbitration control, and/or bus throttling/stalling to pass transactions from one clock domain to the other, e.g., by allowing multiple phases/portions of a transaction to flow from one interface to the other while following the required protocol(s), and as opposed to slowing down the interface(s) to the least common denominator speed.

Figure 1:
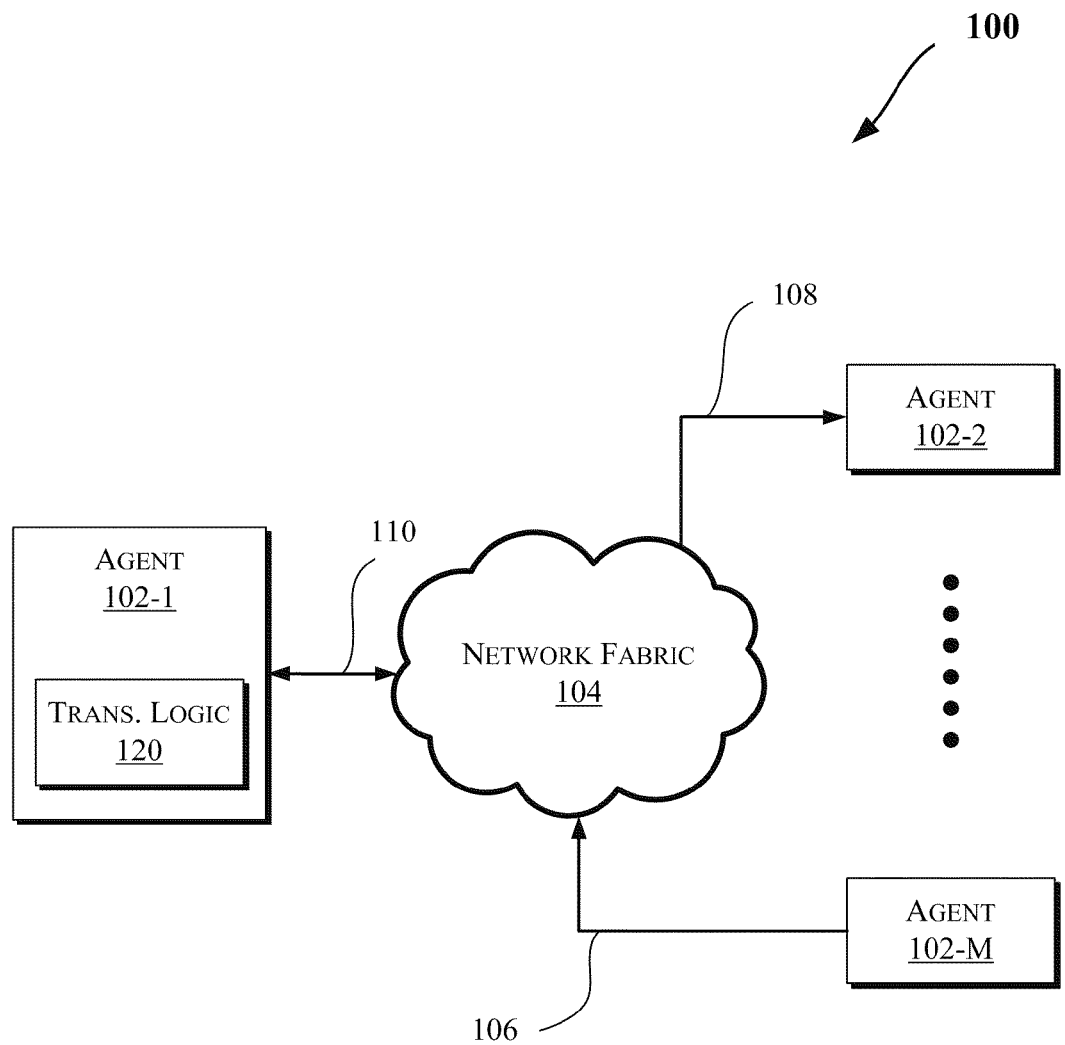
FIGS. 1-3 and 5 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to the remaining figures herein.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

As illustrated in FIG. 1, agent 102-1 may be coupled to or include a translation logic 120. In an embodiment, the translation logic may couple a processor and a chipset, i.e., appear as the chipset to the processor and appear as the processor to the chipset. This in turn allows for queuing requests at one clock frequency and de-queued at another frequency. In various embodiments, the translation logic 120 may utilize one or more of: snoop stalling, arbitration control, and/or bus throttling to pass transactions from one clock domain to the other, e.g., by allowing multiple phases of a transaction to flow from one interface to the other while following the required protocol(s), and as opposed to slowing down the interface(s) to the least common denominator speed.

Figure 2:
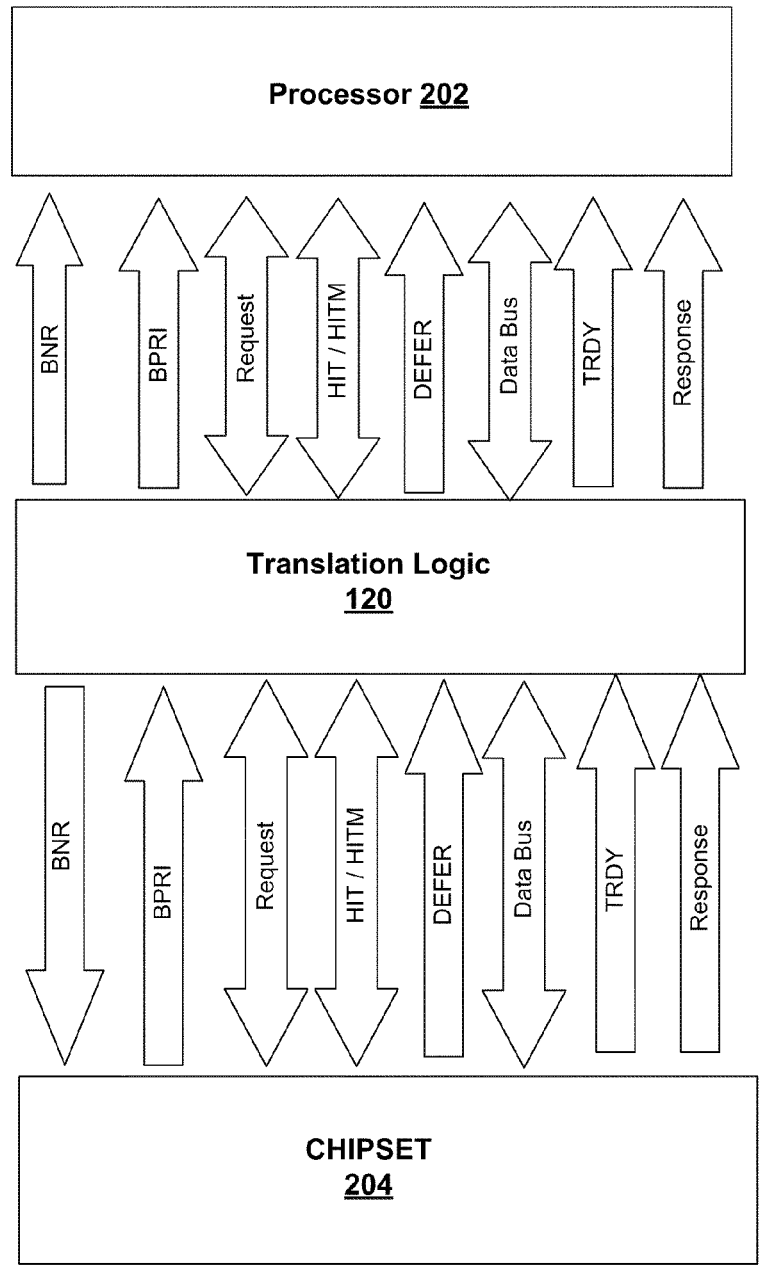

FIG. 2 illustrates a block diagram of a computing system including translation logic to translate requests between a processor 202 and a chipset 204, according to an embodiment. In one embodiment, the system of FIG. 2 may be implemented in one of the agents 102 of FIG. 1 (such as illustrated agent 102-1). Various signals and their direction (or bi-direction) between the components of the system are illustrated in FIG. 2.

In an embodiment, a snoop phase communication may be used in a split agent system, such as the system 100 of FIG. 1 of system of FIG. 2. Moreover, in a system where there are one or more caching agents (CAs) coupled to one or more snooping agents (SAs) (wherein agents 102-1 to 102-M may each be a CA or SA), the snoop phase for a single transaction is sampled by the same clock for all individual agents, in an embodiment. When an intermediary device (translation logic 120) is communicationally placed between CAs and SAs, a new technique is used to keep the system coherent, as follows: (1) on a transaction which starts from a CA, once its snoop phase is reached, it will be stalled; (2) the transaction will be started on the SA bus and it too will be stalled when it reaches the snoop phase; (3) the snoop result is then sampled on the SA's bus; (4) the snoop results are then clock-crossed to the CA's bus and the existing stall is released on the CA side; (5) once the stall is released the (self) snoop results from the CA are sampled; (6) once those are clock-crossed (if necessary) to the SA's bus and ready to be driven, the SA bus stall is removed; and (7) the results from the CA are driven in the appropriate clock. Generally, a bus stall or release may be caused via asserting or deasserting a bus control signal, depending on the implementation.

Figure 4:
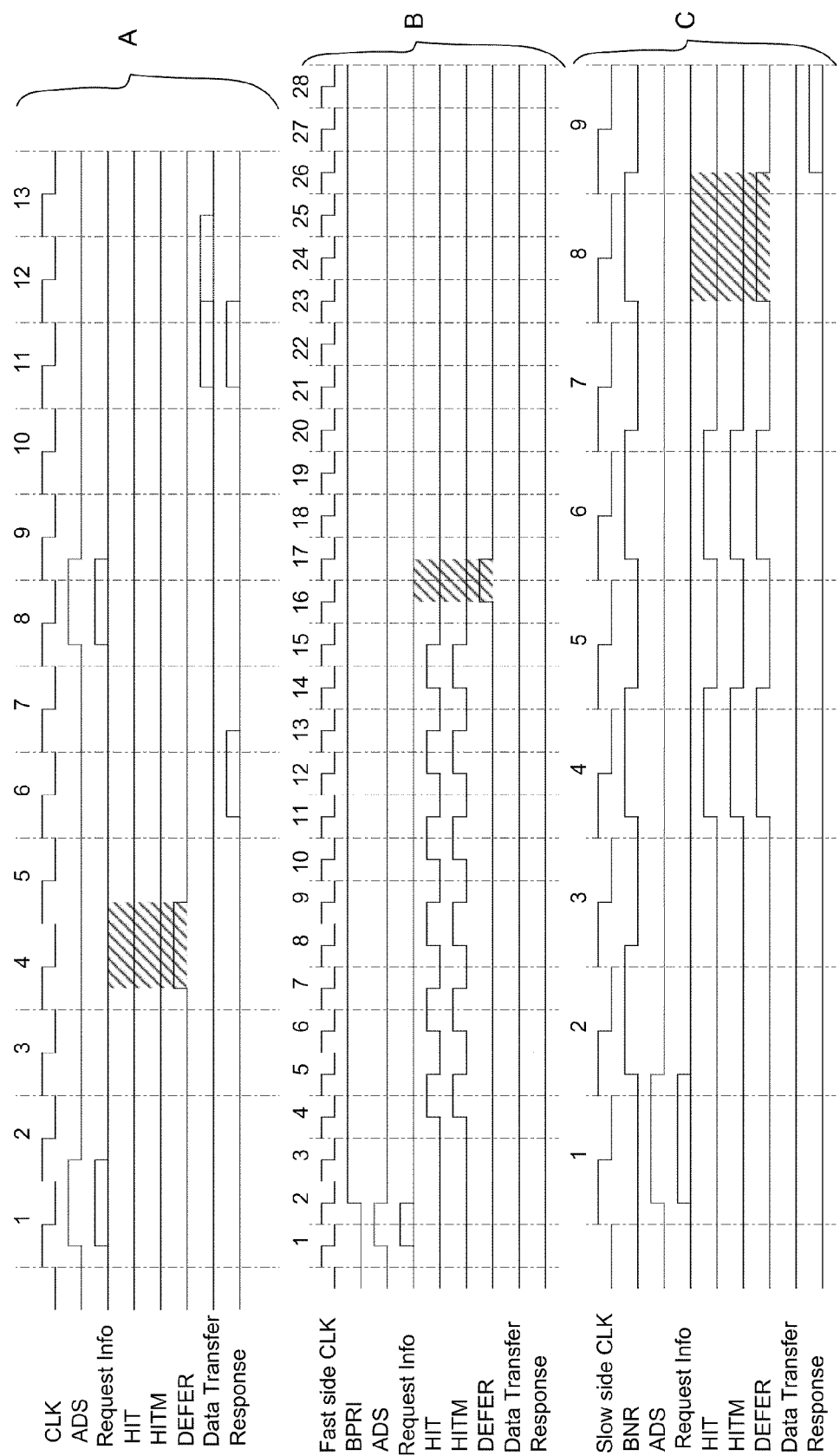
FIG. 4 illustrates several timing diagrams according to some embodiments.

In some embodiments, the stalling starts on a request phase and continues through at least to the snoop phase. The request phase may contain the destination address and the type of transaction being initiated. For a front-side bus system, the assertion of an ADS signal (such as shown in FIG. 4) indicates the start of a transaction and is when the request phase information is valid.

In one embodiment, a BPRI (Bus Priority) signal (which may be an interrupt signal in some systems) may be used to stall the processor and a BNR (Block Next Request) may be used to stall the chipset. In the embodiment illustrated in FIG. 2, the BNR which is normally a bi-directional signal is only driven to control bus ownership.

Furthermore, BPRI may generally be driven by the priority agent, normally the chipset. This signal is used to prevent the processor from starting a transaction. It is asserted when: (1) The slow-side is asserting it; (2) There is a transaction in progress on the fast (thereby enforcing an IOQ=1 environment, for example); (3) A transaction has been DEFER'd and the DEFER REPLY has not occurred yet; (4) RESET is asserted; (5) The BNR processing logic (not shown) is asserted on the CA's bus to prevent multiple requests during BPRI deassertion (6) The slow side BNR processing logic is allowing the snooping agent to launch a request (e.g., to prevent two different transactions from starting on the fast and slow sides at the same time); (7) A request on the CA's bus that results in a modified cache line response during the snoop phase and the data and response phases have completed on both the SA and CA interfaces.

In an embodiment, BNR may be driven by any bus agents (such as agents 102-1 to 102-M of FIG. 1). In the case of the IOQ=1, the translation logic 120 may only drive BNR (and it may not be sampled). This may be the only option to stall and throttle the slow-FSB. In some embodiments, both the slow- and fast-FSB (e.g., the side of the translation logic communicating with the processor 202) may have their BNR signals driven asserted for 1 clock, deasserted for 1 clock, asserted for one clock, deasserted for three clocks. This three clock deassertion allows the chipset 204 to send one upstream request at a time. As soon as a transaction is started on the slow-FSB, the BNR signal is then asserted and deasserted in every clock until that transaction is completed. The fast-FSB protocol for BNR is the same though mostly unnecessary because of the control available through BPRI.

In one embodiment, the translation logic 120 generates a predictive response for a hit modified snoop phase. Moreover, in a system (such as systems of FIG. 1 or FIG. 2) where the CA and SA are operating in different clock domains, there are two techniques used to ensure bus protocol is followed even though signals have not yet safely crossed clock domains (e.g., a faster processor (or FSB) domain versus a slower chipset (or a SOC DUT for example). In the case of a SA hitting modified data in a CA, driving the response in the correct clock for the CA becomes critical to keep the system functional. Because of crossing clock domains, it may be impossible to capture the response on the SA bus and have it ready to drive on the CA's bus in time. One solution to this problem is to predict the SA's response, based on the snoop result. The predictive element is used when the snoop phase results in a modified cache state, in accordance with one embodiment. This prediction may result in the translation logic 120 driving a "write-back" response on the CA bus in the correct clock. Once the real "write-back" response is driven on the SA's bus, it will be discarded by the translation logic, in an embodiment.

In some embodiments, CA write data is queued (e.g., in systems of FIG. 1 or FIG. 2 by logic 120). When data needs to pass from the CA's bus to the SA's bus, it is provided in a particular clock in relation to the target's data ready (TRDY) signal. Two solutions may be used to meet bus protocol requirements while traversing the translation logic 120: (a) TRDY on the SA side is edge detected as being asserted, clock-crossed, and presented to the CA side. Data is then collected on the CA side, clock-crossed, and presented to the SA side. (b) TRDY is asserted on the CA side as soon as a write transaction is detected. Data is then sampled on the CA side, clock-crossed to the SA side, and stored in a queue until TRDY is detected on the SA side. After TRDY is sampled and asserted the data is then driven on the bus following normal data transfer protocol.

In an embodiment, CA/SA arbitration techniques may be used (e.g., systems of FIG. 1 or FIG. 2 by logic 120). Generally, when SA's and CA's share the same bus, a symmetric arbitration protocol is used. Also, there may be no techniques required to ensure they have identically ordered queues of outstanding transactions. If special circumstances are not used because of the intermediary device being in place coherency would be quickly lost. One embodiment used to ensure transaction ordering coherency is to ensure that neither side is allowed to launch a transaction until the other bus is prevented from launching one. When one bus is successfully stalled, the opposite bus is granted a one or two clock opportunity to launch a transaction. If a transaction is launched, the opposite bus will remain stalled until the transaction is started and enters the opposite bus's queue. If no transaction begins, the opportunity to launch is rescinded and the opportunity is given to the opposite bus. This sequence is repeated for all transactions entering the system in some embodiment.

In an embodiment, the following pseudo code represents how the BPRI and BNR may be used:

```
BPRI pseudo code:
    If the other FSB wants to assert BPRI, assert it.
    Otherwise,
        A. If a transaction start from the processor is received, in
    the next clock assert BPRI
        B. Keep BPRI asserted through waiting for the other
    FSB's snoop results
        C. If that transaction is DEFERRED, keep BPRI asserted
    Once
        A. The other FSB stops asserting BPRI, and/or
        B. The transaction from (A) above completes and isn't
    DEFERRED
        C. The other FSB snoop results have been delivered to
    the requesting FSB
        D. A DEFER REPLY completes for the DEFFERED
    transaction BPRI can stop being asserted
    BNR Snoop stalling/throttling:
        All FSBs will require the following:
        1) Deassert BNR
            a. Next state = 2
        2) Deassert BNR
            a. Next state = 3
        3) Deassert BNR
            a. Next state = 4
        4) Assert BNR
            a. If a transaction is outstanding
                i. Next state = 3
            b. Else Next state = 1
```

Snoop Stalling:

HIT and HITM are both asserted to stall the bus whenever the following state machine is in either WAIT2 or STALL2

```
1) IDLE
    a. If transaction starts
        i. Next state = 2
    b. Else Next state = 1
2) WAIT2
    a. If snoop has completed on other FSB
        i. Next state = 5
    b. Else Next state = 3
3) STALL1
    a. Next state = 4
4) STALL2
    a. If snoop has completed on other FSB
        i. Next state = 5
    b. Else Next state = 3
5) DRIVE SNOOP
    a. Next state = 1
```

Figure 3:
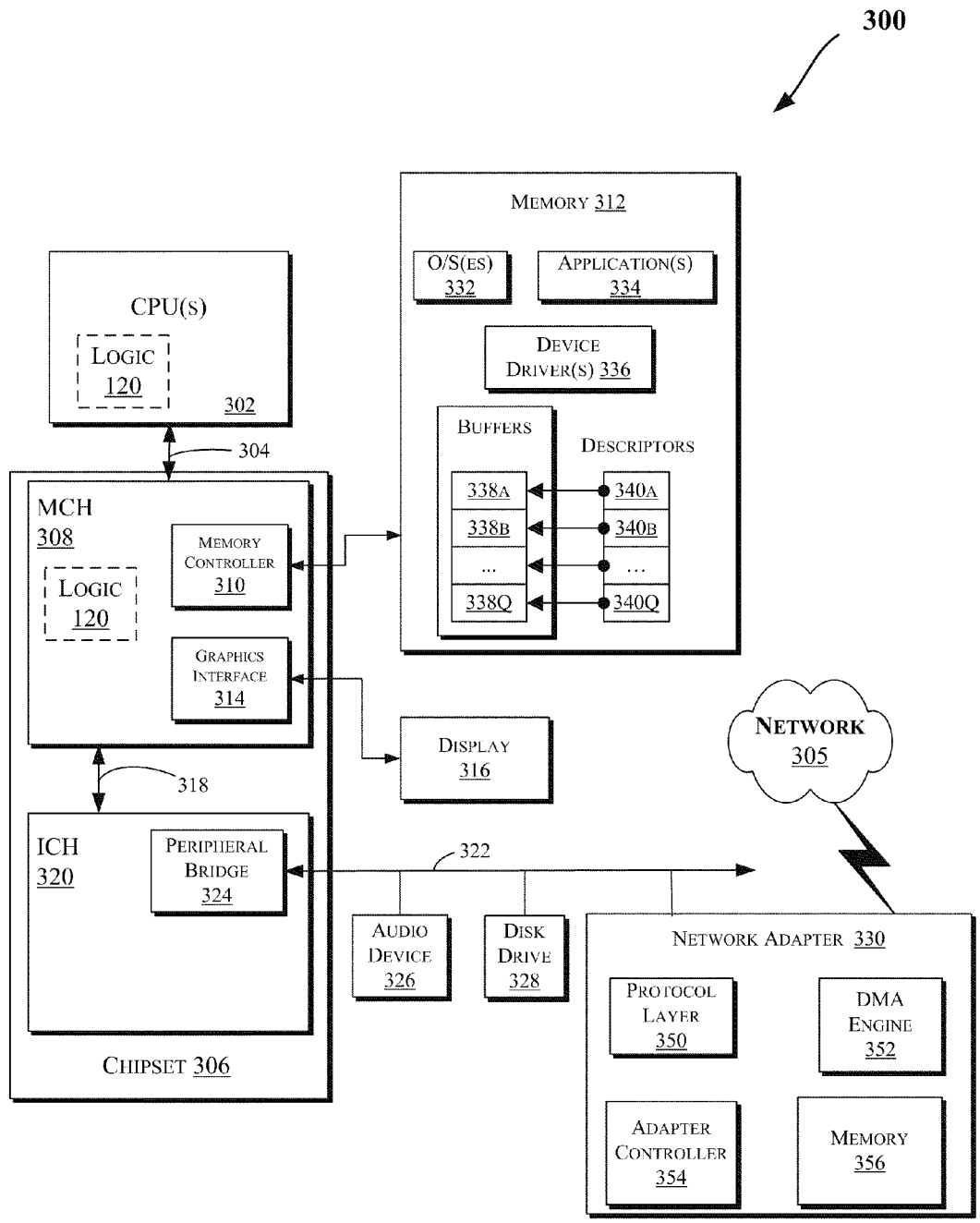

FIG. 3 illustrates a block diagram of an embodiment of a computing system 300. One or more of the components of FIG. 1 and/or of FIG. 2 may comprise one or more components discussed with reference to the computing system 300. The computing system 300 may include one or more central processing unit(s) (CPUs) 302 (which may be collectively referred to herein as "processors 302" or more generically "processor 302") coupled to an interconnection network (or bus) 304. The processors 302 may be any type of processor such as a general purpose processor, a network processor (which may process data communicated over a computer network 305), etc. (including a reduced instruction set computer (RISC) processor or a complex instruction set computer (CISC)). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors.

The processor 302 may include one or more caches (not shown), which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 3 (L2) cache, a level 3 (L-3), a mid-level cache, a last level cache (LLC), etc. to store electronic data (e.g., including instructions) that is utilized by one or more components of the system 300.

A chipset 306 may additionally be coupled to the interconnection network 304. In an embodiment, the chipset 306 may be the same as or similar to the chipset 204 of FIG. 2. Further, the chipset 306 may include a memory control hub (MCH) 308. The MCH 308 may include a memory controller 310 that is coupled to a memory 312. The memory 312 may store data, e.g., including sequences of instructions that are executed by the processor 302, or any other device in communication with components of the computing system 300. Also, in one embodiment of the invention, the memory 312 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 304, such as multiple processors and/or multiple system memories.

As illustrated, the processor 302 and/or chipset 306 may include the translation logic 120 of FIGS. 1-2. As discussed with reference to FIG. 2, logic 120 may facilitate communication between the processor 302 (e.g., via bus 304 which may be a FSB in an embodiment) and slower devices (such as the chipset 306 (e.g., and a DUT coupled to a peripheral bridge 324 and/or a network adapter 330 (e.g., via the DMA engine 352 and buffers/descriptors 338/340)), SOC/DUT (such as discussed with reference to FIG. 2), etc.

The MCH 308 may further include a graphics interface 314 coupled to a display device 316 (e.g., via a graphics accelerator in an embodiment). In one embodiment, the graphics interface 314 may be coupled to the display device 316 via an accelerated graphics port (AGP). In an embodiment of the invention, the display device 316 (such as a flat panel display) may be coupled to the graphics interface 314 through, for example, a signal converter that translates a digital representation of an image stored in a storage device such as video memory or system memory (e.g., memory 312) into display signals that are interpreted and displayed by the display 316.

As shown in FIG. 3, a hub interface 318 may couple the MCH 308 to an input/output control hub (ICH) 320. The ICH 320 may provide an interface to input/output (I/O) devices coupled to the computing system 300. The ICH 320 may be coupled to a bus 322 through a peripheral bridge (or controller) 324, such as a peripheral component interconnect (PCI) or PCIe (PCI express) bridge that may be compliant with the PCIe specification, a universal serial bus (USB) controller, etc. The bridge 324 may provide a data path between the processor 302 and peripheral devices. Other types of topologies may be utilized. Also, multiple buses may be coupled to the ICH 320, e.g., through multiple bridges or controllers. Further, the bus 322 may comprise any type and configuration of bus systems. Moreover, other peripherals coupled to the ICH 320 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 322 may be coupled to an audio device 326, one or more disk drive(s) 328, and a network adapter 330 (which may be a NIC in an embodiment). In one embodiment, the network adapter 330 or other devices coupled to the bus 322 may communicate with the chipset 306. Other devices may be coupled to the bus 322. Also, various components (such as the network adapter 330) may be coupled to the MCH 308 in some embodiments of the invention. In addition, the processor 302 and the MCH 308 may be combined to form a single chip.

Additionally, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 312 may include one or more of the following in an embodiment: an operating system (O/S) 332, application 334, device driver 336, buffers 338, and/or descriptors 340. For example, a virtual machine (VM) configuration (e.g., implemented through on a virtual machine monitor (VMM) module) may allow the system 300 to operate as multiple computing systems, e.g., each running a separate set of operating systems (332), applications (334), device driver (s) (336), etc. Programs and/or data stored in the memory 312 may be swapped into the disk drive 328 as part of memory management operations. The application(s) 334 may execute (e.g., on the processor(s) 302) to communicate one or more packets with one or more computing devices coupled to the network 305. In an embodiment, a packet may be a sequence of one or more symbols and/or values that may be encoded by one or more electrical signals transmitted from at least one sender to at least on receiver (e.g., over a network such as the network 305). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 305).

In an embodiment, the application 334 may utilize the O/S 332 to communicate with various components of the system 300, e.g., through the device driver 336. Hence, the device driver 336 may include network adapter (330) specific commands to provide a communication interface between the O/S 332 and the network adapter 330, or other I/O devices coupled to the system 300, e.g., via the chipset 306. In an embodiment, the device driver 336 may allocate one or more buffers (338A through 338Q) to store I/O data, such as the packet payload. One or more descriptors (340A through 340Q) may respectively point to the buffers 338. In an embodiment, one or more of the buffers 338 may be implemented as circular ring buffers. Also, one or more of the buffers 338 may correspond to contiguous memory pages in an embodiment.

In an embodiment, the O/S 332 may include a network protocol stack. A protocol stack generally refers to a set of procedures or programs that may be executed to process packets sent over a network (305), where the packets may conform to a specified protocol. For example, TCP/IP (Transport Control Protocol/Internet Protocol) packets may be processed using a TCP/IP stack. The device driver 336 may indicate the buffers 338 that are to be processed, e.g., via the protocol stack.

As illustrated in FIG. 3, the network adapter 330 may include a (network) protocol layer 350 for implementing the physical communication layer to send and receive network packets to and from remote devices over the network 305. The network 305 may include any type of computer network. The network adapter 330 may further include a direct memory access (DMA) engine 352, which reads and/or writes packets from/to buffers (338) assigned to available descriptors (340) to transmit and/or receive data over the network 305. Additionally, the network adapter 330 may include a network adapter controller 354, which may include logic (such as one or more programmable processors) to perform adapter related operations. In an embodiment, the adapter controller 354 may be a MAC (media access control) component. The network adapter 330 may further include a memory 356, such as any type of volatile/nonvolatile memory (e.g., including one or more cache(s) and/or other memory types discussed with reference to memory 312). Further, in some embodiments, the network adapter 330 may provide access to a remote storage device, e.g., via the network 305.

FIG. 4 illustrates timing diagrams of direct connect read or write for full/half cache lines (A), deferred transaction signals for fast side (B) and slow side (C) of a translation logic (such as logic 120 discussed with reference to FIGS. 1-3), according to some embodiments. The shaded areas in FIG. 4 illustrate the snoop phase occurrence.

In the matter of merging snoop results associated with a transaction in the environment with the translation logic 120, a sampling technique may be used to avoid a snoop sample deadlock condition. FIG. 4 provides one example of how a snoop phase may be sampled and stalled. The signals associated with this example of a snoop phase are HIT, HITM and DEFER. A snoop stall is created when both the HIT and HITM signals are asserted and in this case are sampled every other clock (CLK). The snoop results are sampled when the snoop stall is terminated and the results are determined from the assertion level of HIT and HITM. These snoop results need to be clock crossed from the CA to the SA. The DEFER signal can be used by the SA to indicate to the CA that a transaction may be returned out of order. In a typical direct coupled system, both the CA and SA observe the snoop phase on the same clock. An alternative approach is required to merge the snoop results from the two interfaces while maintaining proper protocol in the de-coupled system. One solution used in this embodiment is to stall both interfaces (FIG. 4 B5, C5) collecting the snoop results first from the slow-side (FIG. 4 C5—maintaining slow-side stall), passing this to the fast-side (FIG. 4 B16—releasing fast-side stall), collecting the fast-side snoop results (FIG. 4 B17) and presenting this to the slow-side (FIG. 4 C8—releasing slow-side stall).

Figure 5:
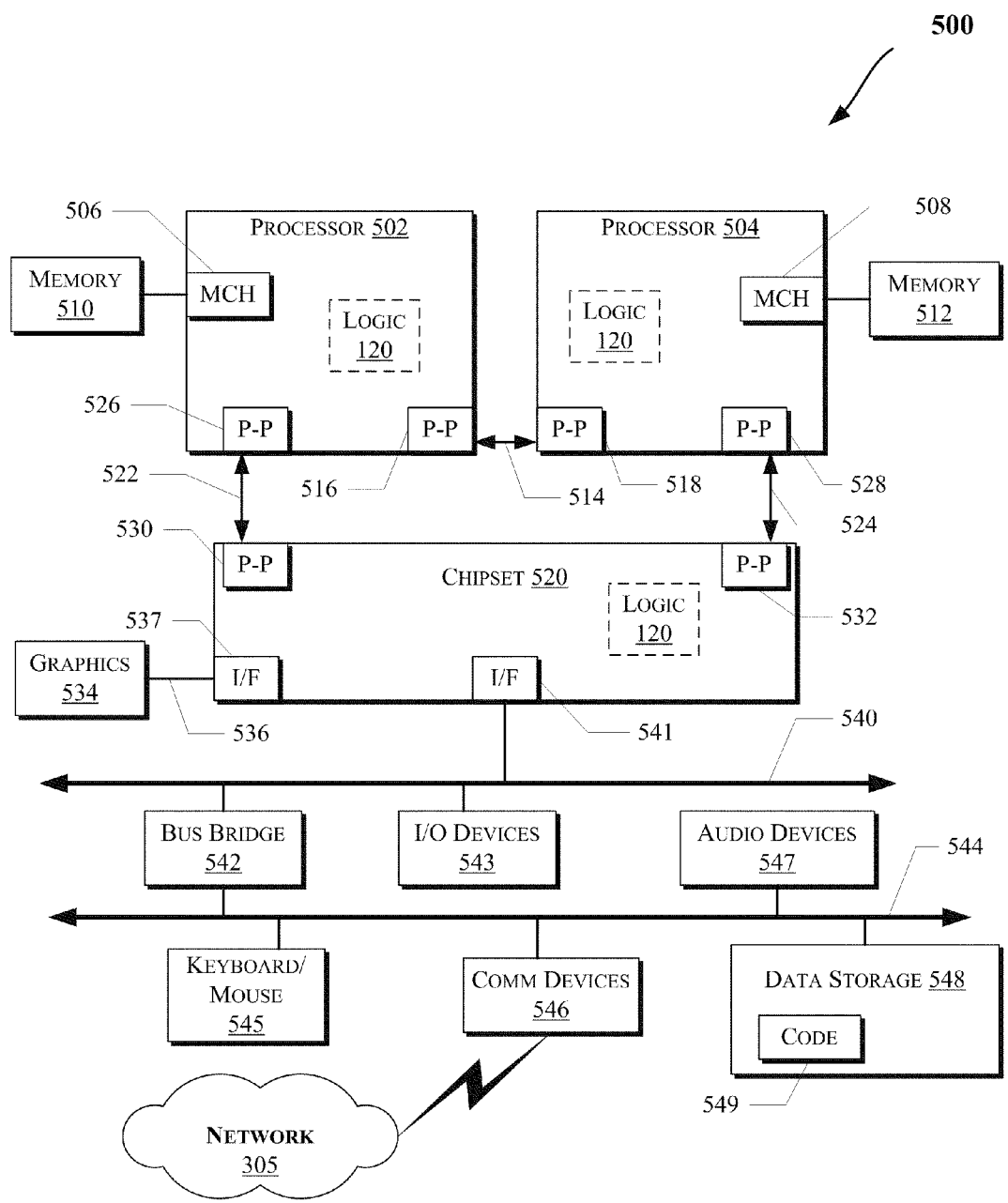

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 312 of FIG. 3. As shown in FIG. 5, the processors 502 and 504 may also include the cache(s) discussed with reference to FIG. 3.

In an embodiment, the processors 502 and 504 may be one of the processors 302 discussed with reference to FIG. 3. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, the logic 120 may be provided in one or more of the processors 502/504 and/or the chipset 520. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 305), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) by way of data signals transferred through a propagation medium, e.g., via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   a translation logic to couple a processor and a chipset, wherein the processor is to be coupled to the translation logic via a first connection that is faster than a second connection that couples the translation logic to the chipset; and
   the translation logic to allow a plurality of portions of a transaction to flow between the processor and the chipset in response to one or more stalls on the first connection or the second connection:
   wherein the translation logic is to predict a response to at least a portion of the plurality of portions of the transaction based on a snoop result and the translation logic is to use the predicted response between the processor and the chipset in response to occurrence of a modified cache state; and wherein the translation logic, and the processor, and the chipset are on a same integrated circuit die.

2. The apparatus of claim 1, wherein the one or more stalls comprise a stall in response to occurrence of a request phase.

3. The apparatus of claim 1, wherein the translation logic is to generate a predictive response in response to occurrence of a hit modified snoop phase.

4. The apparatus of claim 1, wherein the translation logic is to queue the transaction and transmit it based on a target's data ready signal.

5. The apparatus of claim 1, wherein the translation logic is to cause the processor and the chipset to not launch the transaction until at least one of the first connection or the second connection is stalled.

6. The apparatus of claim 1, wherein the one or more stalls comprise a bus priority signal, block next request, or combinations thereof to stall the processor and a block next request to stall the chipset.

7. The apparatus of claim 1, further comprising a device under test to be coupled to the processor via the translation logic.

8. The apparatus of claim 1, further comprising a system on chip to be coupled to the processor via the translation logic.

9. The apparatus of claim 1, wherein the processor is to comprise one or more processor cores, wherein one or more of the processor cores are to comprise a translation logic.

10. A method comprising:
    receiving a transaction at a translation logic that couples a processor and a chipset, wherein the processor is to be coupled to the translation logic via a first connection that is faster than a second connection that couples the translation logic to the chipset,
    wherein the translation logic is to allow a plurality of portions of the received transaction to flow between the processor and the chipset in response to one or more stalls on the first connection or the second connection,
    wherein the translation logic is to predict a response to at least a portion of the plurality of portions of the transaction based on a snoop result and the translation logic is to use the predicted response between the processor and the chipset in response to occurrence of a modified cache state; and wherein the translation logic, and the processor, and the chipset are on a same integrated circuit die.

11. The method of claim 10, further comprising allowing the plurality of portions of the received transaction to flow between the processor and the chipset in response to occurrence of a request phase.

12. The method of claim 10, further comprising generating a predictive response in response to occurrence of a hit modified snoop phase.

13. The method of claim 10, further comprising queuing the transaction and transmitting it based on a target's data ready signal.

14. A computing system comprising:
a memory to store one or more instructions; and
a processor coupled to the memory to execute the one or more instructions, wherein the processor is to comprise:
a translation logic to couple a processor and a chipset, wherein the processor is to be coupled to the translation logic via a first connection that is faster than a second connection that couples the translation logic to the chipset; and the translation logic to allow a plurality of portions of a transaction to flow between the processor and the chipset in response to one or more stalls on the first connection or the second connection, wherein the translation logic is to predict a response to at least a portion of the plurality of portions of the transaction based on a snoop result and the translation logic is to use the predicted response between the processor and the chipset in response to occurrence of a modified cache state; and wherein the translation logic, and the processor, and the chipset are on a same integrated circuit die.

15. The system of claim 14, wherein the one or more stalls comprise a stall in response to occurrence of a request phase.

16. The system of claim 14, wherein the translation logic is to generate a predictive response in response to occurrence of a hit modified snoop phase.

17. The system of claim 14, wherein the translation logic is to queue the transaction and transmit it based on a target's data ready signal.

18. The system of claim 14, wherein the translation logic is to cause the processor and the chipset to not launch the transaction until at least one of the first connection or the second connection is stalled.

* * * * *

UNITED STATES PATENT AND TRADEMARK OFFICE
CERTIFICATE OF CORRECTION

| | | |
|---|---|---|
| PATENT NO. | : 8,296,482 B2 | Page 1 of 1 |
| APPLICATION NO. | : 12/824188 | |
| DATED | : October 23, 2012 | |
| INVENTOR(S) | : Thomas S. Cummins et al. | |

It is certified that error appears in the above-identified patent and that said Letters Patent is hereby corrected as shown below:

In column 10, line 15, in claim 1, delete "connection:" and insert -- connection, --, therefor.

Signed and Sealed this
Fifth Day of March, 2013

Teresa Stanek Rea
*Acting Director of the United States Patent and Trademark Office*